March 31, 1942.   F. A. WOOL   2,277,940
FRUIT TURNING DEVICE
Original Filed April 20, 1938
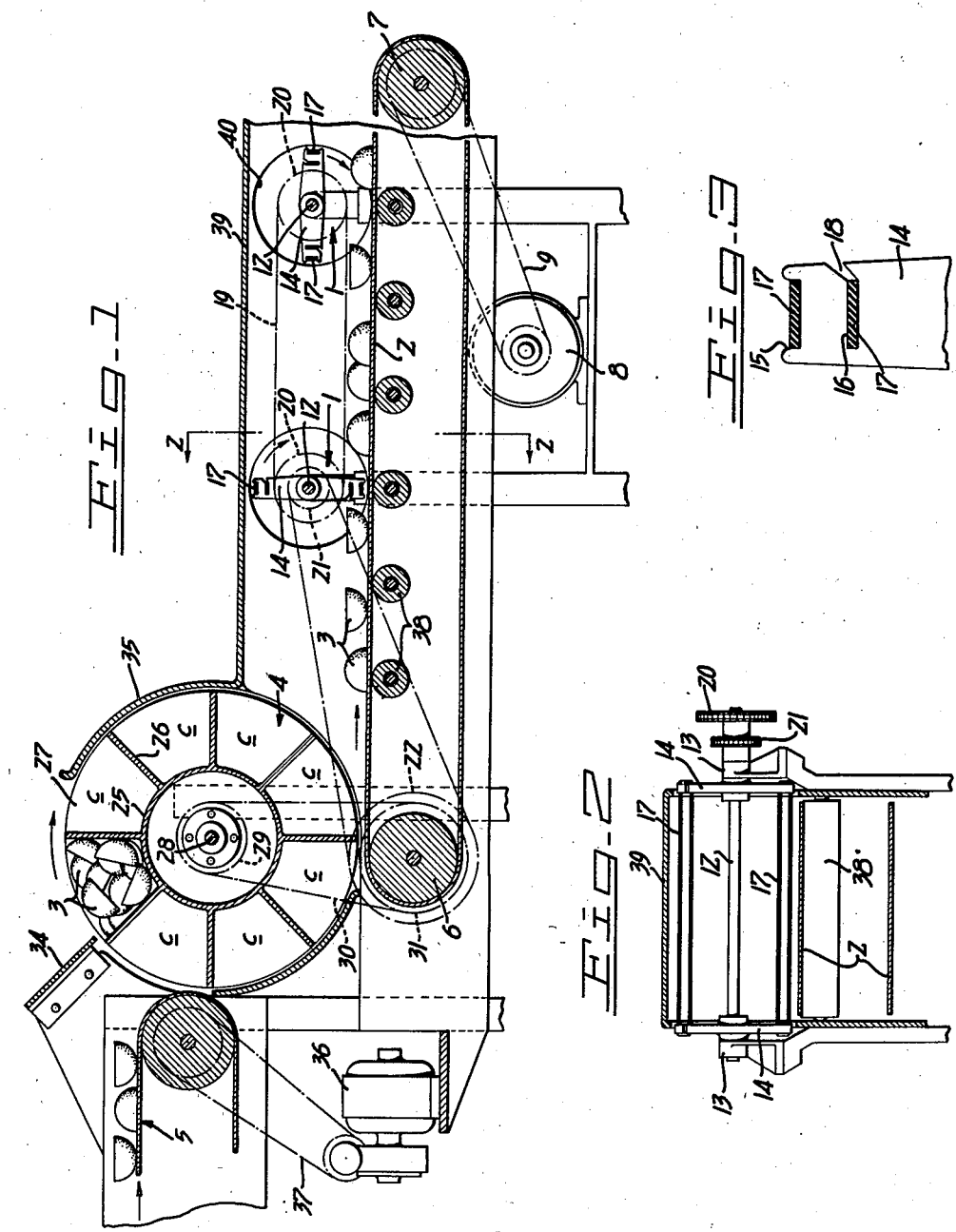
INVENTOR
FRANK A. WOOL
BY Boyken & Mohler
ATTORNEYS Patented Mar. 31, 1942

2,277,940

UNITED STATES PATENT OFFICE 2,277,940

FRUIT TURNING DEVICE

Frank A. Wool, San Jose, Calif.

Original application April 20, 1938, Serial No. 203,070, now Patent No. 2,232,089, dated February 18, 1941. Divided and this application August 10, 1940, Serial No. 352,087

6 Claims. (Cl. 198—33)

This invention relates to a fruit turning device, and has for one of its objects a device and improved method for arranging fruit halves with their convex sides uppermost. Another object is an improved device for use in combination with a conveyor for fruit halves, which device is adapted to turn over such halves as are supported on said conveyor with their convex sides down without disturbing such halves as may be disposed on such conveyor in positions with their convex sides up, and without retarding the speed of travel of the latter halves, and a further object is such device in combination with an endless conveyor adapted to carry the fruit halves rapidly in one direction as distinguished from a reciprocatory or oscillatory movement of the halves such as a shaker table or the like and which device functions to prevent fruit halves not disposed with their convex sides lowermost, from being carried past said device until such halves are inverted. Other objects and advantages will appear in the specification and drawing annexed hereto.

This application is a division of United States Letters Patent No. 2,232,089, issued February 18, 1941.

In the drawing

Fig. 1 is a vertical sectional view taken longitudinally of a conveyor showing my fruit turning devices thereover.

Fig. 2 is a sectional view taken along the line 2—2 of Fig. 1, with a fruit turning device in elevation.

Fig. 3 is an enlarged, fragmentary sectional view through a portion of a fruit turning device of my invention.

Briefly described, heretofore, the most commonly employed type of fruit turning devices has comprised the inclined shaker-table type, in which the fruit halves are fed onto the elevated end of an inclined table, which table is given a vibratory motion to cause the fruit halves, that are positioned with their convex sides downward, to rock until turned over. Others employ tables of this character, or inclined chutes, in either of which the discharge ends of the tables or chutes are slightly elevated from a fruit receiving conveyor or the like, it being contemplated that the halves improperly positioned will turn over to positions with their flat sides against the conveyor upon dropping from such discharge ends.

Still others have contemplated the use of a chute or conveyor belt in combination with a vaned-rotor thereover having a radially outwardly opening hemispherical recess in the vanes that are intended to permit fruit halves on said chute or belt positioned with convex sides uppermost to freely pass through the recesses, but the edges of which recesses will catch the edges of the halves that are disposed with their flat sides up, to invert such halves when the vanes are revolved about the rotor axis in direction opposite to the direction in which the halves are intended to be carried.

In all of these previous attempts, the principal objections are (1) slowness of operation, with resulting decrease in volume of fruit delivered, (2) uncertainty in the functioning of the devices to properly turn over the fruit, and (3) injury to the fruit halves. The latter two objections are most prevalent in the vane type turner, while the first two are most prevalent in the shaker-table type, while all three objections occur to an objectionable degree in both types.

It might be added that in the vane-type turner, it is essential that the fruit halves be carefully guided along spaced rows to the spaced, hemispherical notches in the vanes, which contributes materially to reducing the volume of halves adapted to pass the turner, and also, in this latter type, any fruit halves that are slightly tilted relative to normal so that their advancing side is lower than the following side, are practically certain to be mutilated by the vanes, while undersized halves are likewise mutilated in most instances, even though some of such halves may be turned over by the turner to proper positions.

With my device, the fruit is engaged by soft resilient rubber strips or bands that extend transversely of the direction of travel of the halves, and which bands are revolved transversely of their longitudinal axes, about a central axis offset to one of the sides of the bands, and over the conveyor that carries the halves, hence no injury to the fruit is possible. Also the speed of travel of such halves on said conveyor, as are properly arranged, is not retarded in the least, hence the volume of halves passing the fruit turning apparatus or device, remains fairly constant, inasmuch as this speed may be relatively fast and inasmuch as in normal operation, a relatively large volume of the fruit carried on the conveyor is properly positioned thereon. By ascertaining the average volume of halves that are normally properly positioned on the conveyor before the halves reach the turning device, it is relatively simple to either speed up the conveyor or to slow it down, to insure a uniform delivery of properly positioned fruit at a discharge point, irrespective of how rapidly the improperly positioned halves are caused to be inverted. Insofar as I am aware, any material variation in the speed of the conveyor, with other devices, is not possible, where the conveyor and fruit turning devices function to turn over fruit while carried on the conveyor.

In detail, in Fig. 1 I show a pair of fruit turning devices, generally designated 1, each of which is positioned over the upper run of a horizontally extending, endless conveyor belt 2 that is adapted to carry the fruit halves 3 in the direction indicated by the arrow. Any conventional feed device 4 may feed fruit halves in indiscriminate arrangement onto the conveyor belt 2, the one indicated being merely exemplary of one type of feed device that is adapted to feed a substantially uniform volume of halves per minute to belt 2. A feed belt 5 may be employed to feed fruit to the feed device 4.

The conveyor belt 2 extends over pulleys 6, 7 at its ends, one of which may be driven at any desired speed by a motor 8 connected thereto by a drive belt 9. In the present instance pulley 7 is connected with the motor for driving, said pulley being at the end of the belt 2 that is beyond the turners 1.

While I show a pair of turners 1, it is obvious that one or more may be employed, but, as will later be explained, a plurality of turners is preferable under most conditions. These turners 1 are at spaced points along the belt 2, and as their construction is identical, only one will be described in detail, the numerals used being applicable to either.

Each of the turners comprises a horizontally extending shaft 12 spaced above and extending across the belt 1. Shafts 12 of the pair of devices are parallel and horizontally spaced, and each shaft is rotatably mounted in bearings 13 adjacent opposite ends (Fig. 2). A cross arm 14 is centrally secured to each opposite end of shaft 12. Each end of each arm 14 is formed with a groove 15 and an opening 16 (Fig. 3), the grooves 15 being on the outermost ends of the arms and facing radially outwardly of shaft 12, while openings 16 are spaced radially inwardly of grooves 15. The arms 14 on the ends of each shaft are in opposed relation and the openings 16 in the corresponding end portions of the arms are in horizontal alignment. The grooves 15 in corresponding end portions of the arms are also in horizontal alignment. An endless rubber band 17 is supported in stretched condition across the belt 2, between each of the opposed end portions of arms 14, said band extending through the openings 16 and then over the outer ends of the arms in grooves 15. The runs of each band are relatively close together, the outer run being that which lies in the grooves 15, in which it is held. Each band is mounted on the corresponding end portions of the arms by slipping the same through slots 18 that open outwardly of the arm portions through the sides of the latter that face toward the normal directional movement of the arms during revolution of shafts 12, as will later be explained.

Each slot 18 preferably extends slantingly from one end of each opening 16, so as to provide a resistance at the juncture of the opening 16 and slot 18 to any tendency of the band 17 to slip out of the openings. Also the bands 17 are preferably flat, and grooves 15 and openings 16 are shaped with flat sides to correspond to the flat sides of the band, one of the flat sides of the band facing shaft 12 and the other facing radially outwardly of the shaft.

The two shafts 12 are connected for rotation in the same direction by a belt 19 extending over a pulley 20 on a corresponding end of each shaft 12 and the shaft 12 that is nearest the feed device 4 may also be provided with a pulley 21, driven by a belt which extends over it, and which also extends over a pulley 22 secured on the shaft that mounts the belt pulley 6 that is nearest said feed device. The pulley 22 is preferably somewhat larger than pulley 21 so that the shafts 12 will be revolved at a substantially greater speed than the speed of travel of belt 2, the belt pulleys 6, 7 being, of course, smaller in diameter than pulley 22.

While any suitable feed device may be used, it is desirable that such device feed a substantially uniform volume of halves onto belt 2, and the feed device shown is found to be highly satisfactory. Said device comprises a drum 25 extending transversely across one end of belt 2, which drum has radially outwardly projecting, equally spaced vanes 26 extending longitudinally of the drum, and ends 27 extending across the ends of the drum and ends of the vanes. Thus the drum sides, vanes and ends 27 cooperate to form equal sized radially outwardly opening compartments C around the drum. A shaft 28 supports the drum for rotation about its central horizontal axis, and a pulley 29 on said shaft is connected by a belt 30 with a pulley 31 on the shaft that mounts pulley 22 for revolving the drum and vanes 26 upon actuation of belt 2 by the motor 8.

The feed belt 5 may feed the fruit halves 3 to the compartments C at the side of the feed device opposite belt 2, and at a higher elevation than belt 2. A blade 34 over the feed device is positioned to prevent over-loading any of the compartments C and a stationary closure plate 35 at the side of the feed device over and spaced above belt 2 is adapted to prevent fruit from falling out of compartments C until the compartments open downwardly toward said belt at a sufficient angle to insure a clean discharge of fruit halves from the compartments onto belt 2. The feed belt 5 may be actuated by a motor 36 sonnected to one of the pulley shafts mounting belt 5 by a belt 37 for actuating said belt 5.

The upper run of belt 2 is supported on a row of rollers 38 at that portion of its length that passes below the turners 1. Thus said portion of the belt will always be properly spaced from the turners irrespective of variations in the weight of the fruit or any downward force on the belt 2.

The arms 14 on shaft 12 that is nearest the feed device are preferably secured to said shaft in a position to extend at right angles to the arms on corresponding ends of the other shaft, so that the arms on one of the turners will not be parallel with the arms on the other, and where more than two turners are used, the arms are preferably so positioned that the arms on adjacent turners are not parallel.

The circular path of travel of the bands 17 of each turner, is common to both bands of the pair, and the lowermost side of the circular path of the radially outermost band of each pair is positioned at a level about midway between the upper surface of belt 2 and the level of the uppermost point of any fruit half on the belt, irrespective of whether the half is with its flat face down or with the convex side down.

In operation, as the belt 2 is moved in the direction indicated by the arrow, the bands 17 are revolved about shafts 18, and where they come nearest the belt their direction of movement is opposite the direction of movement of the belt. Thus the leading convex sides of fruit halves 3, that are supported on the belt with their flat sides uppermost, are engaged by the rubber bands, which are rapidly revolved transversely of their longitudinal axes, about a central axis offset to one of the sides of the bands, and the fruit halves are flipped rearwardly over to positions with their convex sides uppermost. All halves on the belt that are positioned with their convex sides uppermost will freely slide under the rubber bands, the bands readily yielding to permit the halves to so pass. Should any of the halves fail to be properly inverted by the first engagement with the bands, they will be flipped rearwardly, and prevented from passing the bands until properly inverted.

Under unusual circumstances, a fruit half may pass the first of the turners without being inverted, but this is relatively rare, and where this does occur, the second turner will function to properly invert such halves by reason of the bands on the second turner being disposed at different positions in their circular path relative to the positions of the bands of the first turner. It will be seen that the second turner in reality, coacts with the first turner and belt 2, so that the bands on the pair of turners will effectively scan substantially the full area of the belt 2 passing therebelow, thus precluding passage of some of the improperly positioned halves past both turners due to the possibility of such halves being carried past the first turners when the arms thereof are substantially horizontal.

The rollers 38, bearings 13, blade 34, pulleys and feed device, as described, are all suitably supported on frame members or brackets, as illustrated in the drawing and a housing 39 preferably extends over the turners and then downwardly past opposite side edges of the upper rim of belt 2 so as to prevent any of the fruit halves flipped upwardly by the turners from falling off the belt 2. Also the sides of said housing are formed with openings 40 for the arms 14 to revolve in, said arms being slightly offset outwardly relative to the inner surfaces of the sides of said housing so as not to accidentally strike fruit halves that may glance off said surfaces.

The invention as herein described is suitable for use in arranging fruit or vegetable halves for inspection of the convex sides, or for use in arranging such halves preparatory to further operations thereon, such as slicing or dicing or any operation where it is desirable to have the halves arranged uniformly with their flat sides down.

The use of the soft elastic rubber bands precludes any damage to the fruit, which is particularly important in the case of peeled fruit, such as peaches, pears, etc., since some of such fruit is quite susceptible to injury by striking hard objects, and also the elimination of a vibrating table or chute, as has heretofore been generally used, prevents such injury as sometimes results from subjecting the halves to rubbing on such table or chute.

Having described my invention, I claim:

1. Apparatus of the character described comprising conveyor means for supporting fruit halves thereon for movement in a generally horizontally extending path of travel in one direction; means actuating said conveyor means for causing said movement, a fruit turner at a point along said path, said turner including a straight, elongated member extending horizontally across said path, means mounting said member for movement transversely of its length in a vertically disposed circular path the lower portion of which extends into the path of travel of said halves, means for moving said member in said circular path in direction in which the movement thereof in said lower portion is opposite to the direction of movement of said halves, whereby such halves as are carried on said conveyor means with their flat sides facing upwardly will be engaged at their advanced, downwardly facing, convexly curved sides by said member, and will be flipped over by movement of said member upon travel of said member through said lower portion of said circular path, said member being elastic for yieldably sliding over the advanced upwardly facing convex sides of such halves as are carried on said conveyor means with their flat sides facing downwardly thereby permitting such latter halves to pass said member free from obstruction thereby.

2. In apparatus of the character described, a horizontally extending, endless conveyor belt for supporting fruit halves thereon for movement in one direction, a fruit turner over said belt for inverting fruit halves that may be supported on said belt with their flat cut sides uppermost and their convexly curved sides facing toward said belt, said fruit turner comprising a pair of opposed members adjacent opposite lateral edges of said belt; a pair of spaced, parallel, elastic bands extending horizontally between said opposed members; means supporting said members for rotation about an axis parallel with and substantially midway between said bands for revolution of said bands transversely of their lengths about said axis in a circular path disposed over said belt, said latter means supporting said members and belt in a position in which the lower portion of said circular path extends into the path of travel of fruit halves supported on said conveyor; means for revolving said member and said bands in direction for movement of said bands at said portion opposite to the direction of movement of said halves; and means for actuating said belt for causing said latter movement.

3. In a construction as defined in claim 2, a second fruit turner identical in construction to the aforesaid fruit turner spaced from the latter and positioned similar to said latter turner relative to said belt, the bands on said second fruit turner being disposed in a different plane from the plane in which the bands of said first turner are disposed, and means for actuating both of said fruit turners simultaneously and at similar rates of speed.

4. In a construction as defined in claim 2, a housing spaced above the bands thereof and having a top wall extending over and longitudinally of said conveyor belt in direction from said turner opposite to the direction of movement of fruit to be carried on said belt and lateral side walls extending upwardly from opposite side edges of said belt.

5. In apparatus of the character described, a horizontally extending, endless conveyor belt for supporting fruit halves thereon for movement in one direction, a fruit turner over said belt for inverting fruit halves that may be supported on said belt with their flat, cut-sides uppermost and their convexly curved sides facing toward said belt; said fruit turner including an endless rubber band taut and in a position extending horizontally across said belt with the runs of that portion of the band extending across said belt parallel and spaced apart; means supporting said band in said position for moving the runs thereof transversely of their length in a circular path about a horizontal axis extending parallel with said runs and in which position said circular path extends into the path of travel of the fruit to be carried on said belt; means for so moving said runs in a direction for movement at said portion opposite to the direction of movement of said halves, and means actuating said belt for carrying said halves in said path of travel.

6. A construction as defined in claim 5, the means supporting said band comprising opposed members disposed adjacent opposite lateral edges of said belt, and extending radially outwardly from opposite sides of said axis; said band extending between said opposed members from points respectively spaced radially from said axis at one side thereof, and a second endless rubber band connected with said members and extending therebetween from points spaced from the opposite side of said axis a distance substantially equal to the distance between said axis and the first mentioned band.

FRANK A. WOOL.